Jan. 24, 1961 A. M. WYROD 2,969,241

RAISING AND LOWERING DEVICE FOR PHONOGRAPH ARM

Filed July 17, 1959 2 Sheets-Sheet 1

INVENTOR.
ALEX M. WYROD
BY
Donnelly, Mentag & Harrington
ATTORNEYS

Jan. 24, 1961    A. M. WYROD    2,969,241

RAISING AND LOWERING DEVICE FOR PHONOGRAPH ARM

Filed July 17, 1959    2 Sheets-Sheet 2

INVENTOR.
ALEX M. WYROD
BY Donnelly, Mentag & Harrington
ATTORNEYS

United States Patent Office 2,969,241
Patented Jan. 24, 1961

2,969,241

RAISING AND LOWERING DEVICE FOR PHONOGRAPH ARM

Alex M. Wyrod, 21149 Huntington, Harper Woods, Mich.

Filed July 17, 1959, Ser. No. 827,835

3 Claims. (Cl. 274—14)

This invention relates generally to phonographs and, more particularly, to a new and improved repeating device for phonographs and the like.

In some instances it is desirable to repeat or replay many times a certain part of a record for memorization purposes or the like. For example, when a musician wants to memorize a certain passage he may do this by playing this part of the record over and over again and, of course, this involves resetting the tone arm many times. Such repetition is tedious and may be injurious to both the record and stylus, especially if the stylus is not gently placed each time onto the record. Furthermore, it is not an easy matter to place the stylus at the exact desired portion of the record each time to repeat the particular desired passage. Accordingly, it is an important object of this invention to provide a repeating device for phonographs which is adapted to permit the user to move the stylus downwardly into operative engagement with the record in a simple and easy operation without damage to the stylus.

It is another object of the present invention to provide a repeating device for phonographs which may be easily and quickly adapted for use on conventional phonographs or other reproducing machines without requiring any alteration in the construction of the machine.

It is a further object of the present invention to provide a repeating device of the character described which is adapted to lift a tone arm of a phonograph upwardly and return it to a predetermined starting point and then move it downwardly gently into operative engagement with the record with a featherlike and silent touch.

It is still another object of the present invention to provide a repeating device of the character described which is simple and compact in construction, economical of manufacture, and efficient in operation.

Other objects, features and advantages of this invention will be apparent from the following detailed description and appended claims, reference being had to the accompanying drawings forming a part of the specification wherein life reference numerals designate corresponding parts of the several views.

Figures 1, 2:
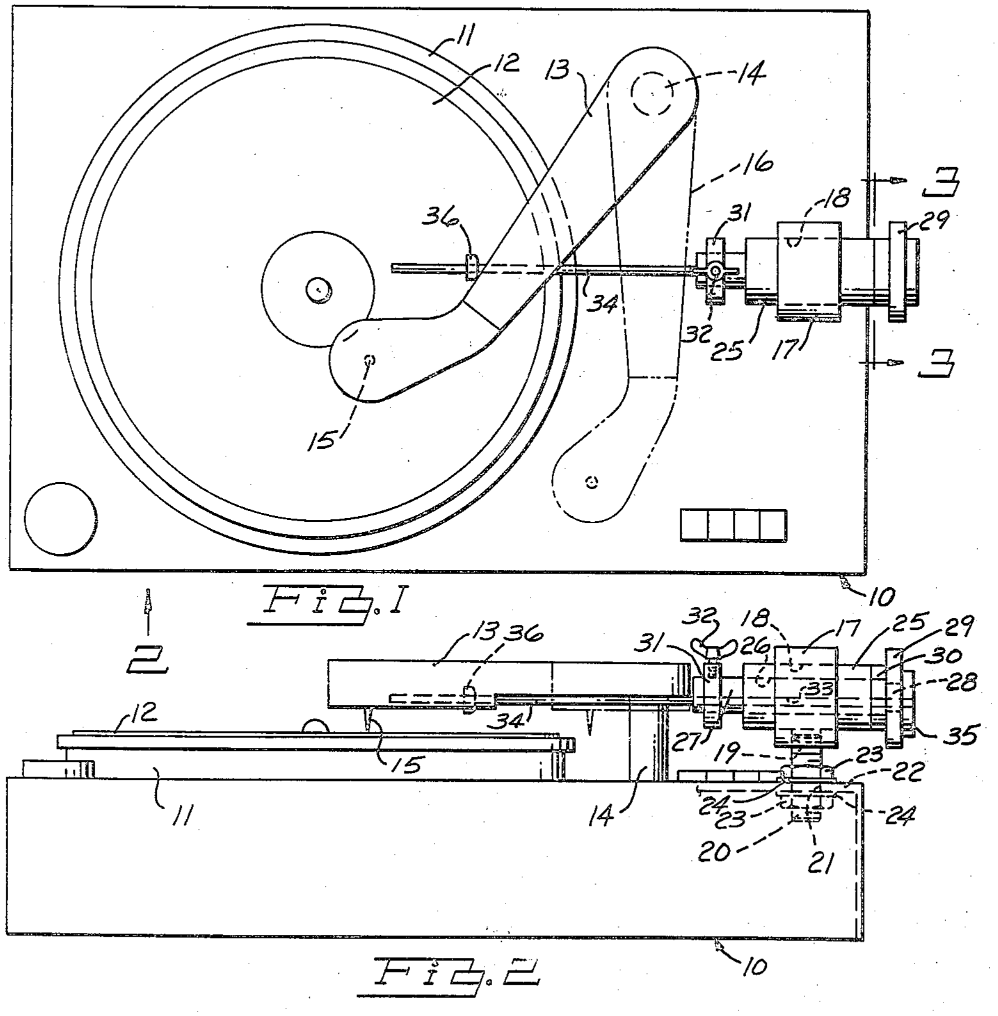
Fig. 1 is a top plan view of a phonograph provided with a repeating device made in accordance with the principles of the invention.
Fig. 2 is an elevational view of the structure shown in Fig. 1, taken in the direction of the arrow marked 2.

Referring now to the drawings and, in particular, to Figs. 1 through 4, the numeral 10 generally indicates a conventional phonograph which is provided with the usual turn table 11 on which is operatively carried the record 12. The phonograph 10 is provided with the usual tone arm 13 which is pivotally mounted on the vertical shaft 14, at one end thereof, and which carries the usual stylus 15 on the other end thereof. As shown in Fig. 1, the tone arm 13 is adapted to be swung from the inoperative broken line position 16 to the record playing solid line position.

The phonograph 10 is provided with a repeating device made in accordance with the principles of the invention and which is adapted to be mounted directly on the phonograph housing. As shown in Figs. 1 and 2, the repeating device comprises the cylindrical body member 17 which is provided with the axial hole 18 therethrough. The body 17 is provided on the lower side thereof with the threaded hole 19 which is adapted to operatively receive the upper end of the threaded supporting leg or means 20, the lower end of which is adapted to pass through the hole 21 in the phonograph housing upper wall or motorboard 22. The screw 20 is adapted to be adjustably secured in place relative to the housing wall 22 by means of the lock nuts 23 and washers 24.

Figure 3:
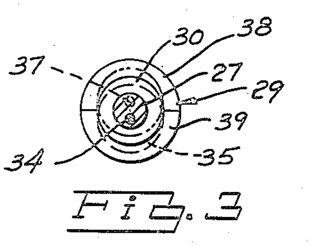
Fig. 3 is an elevational sectional view of the structure illustrated in Fig. 1, taken along the lines 3—3 thereof and looking in the direction of the arrows.

A repeating device shown in Figs. 1 through 4 further includes a tubular member or sleeve 25 which is adapted to be fixedly secured in the hole 18 in the body 17 by any suitable means as by means of a press fit therebetween. Slidably mounted in the axial hole 26 through the sleeve 25 is the adjusting member or shaft 27, the front end of which protrudes outwardly beyond the inner end of the member 25 and the rear end of which extends outwardly beyond the outer end of the member 25. Fixedly mounted on the reduced rear end portion 28 of the adjusting shaft or rod 27 is the enlarged operating knob 29 which may be knurled on the outer periphery thereof, if desired. Fixedly mounted on the rod 27 immediately in front of the knob 29 is the ring 30 which forms an abutment or shoulder for engaging the rear end of the fixed tubular member 25. It will be seen that the adjusting rod 27 may be slid forwardly and backwardly in the tubular member by merely grasping the knob 29 and moving it forwardly and backwardly. A stop ring 31 is adjustably mounted on the inner end of the adjusting rod 27 by any suitable means as by the wing nut 32. It will be seen that the stop ring 31 is adapted to be set in any disposed portion on the rod 27 to regulate the length of movement of the rod 27. As shown in Figs. 2 and 3, the adjusting rod 27 is provided with an axial hole 33 therethrough which is located eccentrically relative to the longitudinal center line of the rod 27. Slidably mounted through the eccentrically disposed hole 33 is the lifting arm or rod 34 which is provided at the rear end thereof with a fixedly mounted disk-shaped head 35 which limits the inward movement of the rod 34. Slidably adjustably mounted on the inner end of the rod 34 is a stop or abutment member or washer 36 which is preferably made from a suitable resilient material as rubber or the like.

Figure 4:
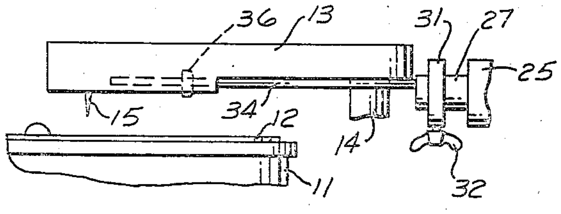
Fig. 4 is a fragmentary elevational view of the structure illustrated in Fig. 1, and showing the tone arm in a raised position.

It will be seen that the supporting body 17 may be adjusted upwardly and downwardly by means of the threaded supporting member 20 and the nuts 23, whereby when the adjusting rod 27 is disposed as shown in Fig. 2, the lift rod 34 will extend under the tone arm 13 at a height to permit the stylus 15 to operatively engage the record 12. In order to lift the tone arm 13 and disengage the stylus 15 from the record 12, the user merely turns the knob 29 180° whereby the rod 27 is turned 180° and brings the lift rod 34 upwardly to the dotted line position shown in Fig. 3 and indicated by the numeral 37. As shown in Fig. 4, the rod 34 when it is in its upper position 37, will lift the tone arm above the record 12. The tone arm 13 may then be moved backwardly by merely pulling outwardly on the knob 29 or to the right as viewed in Figs. 1, 2 and 4. The outward movement of the stylus by means of the rod 34 will be limited by means of the stop ring 31 on the rod 27. It will be seen that the member 31 operates to limit the outward movement of the tone arm and the slidably mounted abutment member 36 functions to engage the tone arm 13 for return movement purposes. The member 36 may be adjustably mounted on the arm 34 by any suitable means as by means of a frictional engagement therewith. As shown in Fig. 3, the inner face of the knob 29 may be provided with a first color as red on the upper half 38 thereof and with a second color as green on the lower half thereof, as indicated by the numeral 39. It will be seen that when the red color is disposed upwardly this will indicate to the user that the tone arm is down, and when the knob 29 is turned so as to lift the rod 34 upwardly, the green half 39 of the knob face will be disposed upwardly to indicate this position to the user.

The inner abutment member 36 is set at a point about ⅛ of an inch after the ending of a passage which is recognized by the listener. The outer stop or abutment member 31 would be set on the rod 27 at a distance from the inner end of the fixed tubular member 25 to compensate for the setting of member 31. When the tone arm 13 is lifted upwardly in the aforedescribed manner, it may then be swung outwardly to the desired starting point by moving the adjusting rod 27 outwardly or to the right as viewed in Fig. 2 until the stop member 31 engages the inner end of the member 25. At this point the knob 29 is rotated to bring the indicating red surface portion 38 upwardly which action lowers the tone arm into operative engagement with the record at the starting point of the passage with a smooth, silent and feather-like touch. Experience has shown that with a repeating device of the present invention it is possible to replay any desired passage of a record over and over again in a fast and easy operation without damage to the stylus and record. The needle can be lowered into the same starting point as often as wanted.

Figures 5, 6, 7, 8, 9:
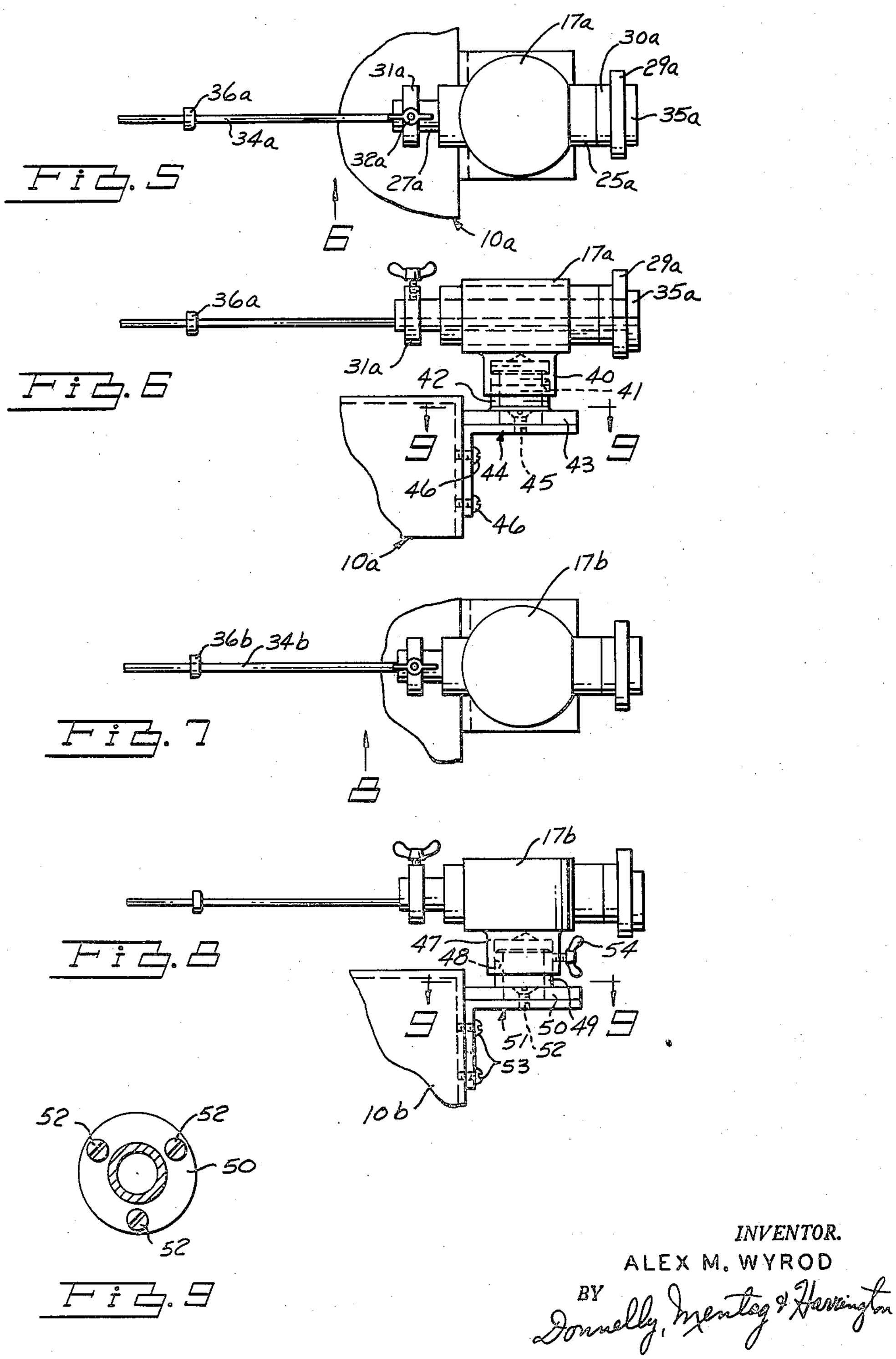
Fig. 5 is a top plan view of a second embodiment of the invention, showing the same mounted on a fragmentary portion of a phonograph.
Fig. 6 is an elevational view of the structure shown in Fig. 5, taken in the direction of the arrows marked 6.
Fig. 7 is a top plan view of a third embodiment of the invention and showing the same mounted on a fragmentary portion of a phonograph.
Fig. 8 is a side elevational view of the structure illustrated in Fig. 7, taken in the direction of the arrows marked 8.
Fig. 9 is a fragmentary horizontal sectional view of the structure illustrated in Fig. 8, taken along the line 9—9 thereof and looking in the direction of the arrows.

Figs. 5 and 6 illustrate a second embodiment of the invention, and the similar structure is marked with corresponding reference numerals followed by the small letter "*a*." The only difference between the embodiments of Figs. 5 and 6 and the first embodiment of Figs. 1 through 4 is in the supporting and adjusting structure as shown in Figs. 5 and 6. The threaded supporting rod 20 of the first embodiment is replaced by a different type of adjustable supporting means. The numeral 40 indicates a cylindrical body 17*a* which extends downwardly from the lower side thereof. The support leg 40 is provided with the threaded hole 41 in the lower end thereof which is adapted to threadably receive the hollow threaded leg 42. The leg 42 is fixedly mounted on the flange 43 which is in turn secured on the horizontal leg of the support bracket 44 by means of the screw 45. The support bracket 44 is fixedly mounted on the side of the phonograph 10*a* by any suitable means, as by means of the screws 46. The embodiment of Figs. 5 and 6 operates in the same manner as the first described embodiment for raising and lowering a tone arm.

A third embodiment of the invention is illustrated in Figs. 7, 8 and 9, and this embodiment is similar to the first described embodiment and the corresponding parts thereof are marked with similar reference numerals followed by the small letter "*b*." The difference between the third embodiment and the first embodiment is in the vertical adjustable supporting means. As shown in Fig. 8, the support member 17*b* is provided with the downwardly extended integral hollow leg 47 which is provided with the hole 48 in the lower end thereof. Slidably mounted in the hole 48 is the tubular leg or sleeve 49 which is provided on the lower end thereof with the integral flange 50. The flange 50 is adapted to be secured to the horizontal leg of the support bracket 51 by any suitable means, as by means of the screws 52. The bracket 51 is adapted to be suitably fixed to the phonograph 10*b* by any suitable means, as by the screws 53. The supporting sleeve 49 is slidably mounted in the hole 48 and may be secured in any desired vertically adjusted position by means of the lock screw 54. This third embodiment functions in the same manner as described hereinbefore for the embodiment of Fig. 1. It will be understood that all of the embodiments may be made from any suitable light-weight metals or other material, as desired.

All of a record may be played with this device and it may be used for repeating the record or starting another. The feather-like touch of the tone arm diamond when seated in record grooves by the instant device saves both the record and the diamond and saves valuable records from being scratched. This device can be adapted for use on automatic record changers by switching them to manual operation and operating the same as a transcription table, either for repeating passages or playing valuable records which automatic changers ruin in time.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims. As for example, the rod 27 may be provided with indicia or marks thereon for indicating the relative adjusted positions of the rod 27 relative to the sleeve 25, to enable the user to bring the tone arm back to the same desired starting position on the record.

What I claim is:

1. A repeating device for use with a phonograph having a tone arm provided with a stylus adapted to engage the sound grooves in a record, comprising: a body member; means for adjustably mounting said body member on the phonograph for adjustable vertical movement; a rod slidably and rotatably mounted in a horizontal position in said body member, said rod having a longitudinal bore therein eccentrically displaced from and parallel to its longitudinal axis, a lifting arm slidably mounted in said bore in an eccentric position relative to said axis and having the one end thereof extended inwardly of said phonograph and under the tone arm, whereby, when said rod is in a first position with the lifting arm disposed at its lowest position, the tone arm may operate freely on the record and when the rod is rotated to second position to bring the lifting arm to its highest position, the tone arm will be lifted to permit the rod to be slid outwardly to place the tone arm back to a desired starting place on the record.

2. A repeating device as defined in claim 1, wherein: said means for adjustably mounting said body member comprises a bracket fixedly mounted on the phonograph, a first supporting leg fixed to said body member, and, a second supporting leg fixed on said bracket and adapted to be adjustably connected with said first supporting leg.

3. A repeating device for use with a phonograph having a tone arm provided with a stylus adapted to engage the sound grooves in a record, comprising a body member, means for adjustably mounting said body member on the phonograph for adjustable vertical movement; a horizontal elongated sleeve extending through and fixed to said body member, a rod slidably guided and rotatably journaled within said sleeve in a horizontal position, said rod having a longitudinal bore therein eccentrically displaced from and parallel to its longitudinal axis, a lifting arm slidably mounted in said bore and in an eccentric position relative to said axis and having the one end thereof extending inwardly of said phonograph and under the tone arm, an adjustable resilient stop member mounted on said lifting arm to limit inward movement of the tone arm, a knob upon the outer end of said rod engageable with said sleeve, and an enlarged head on the outer end of said arm engageable with said rod, whereby, when said rod is in a first position with the lifting arm disposed at its lowest position, the tone arm may operate freely on the record and when the rod is rotated to a second position to bring the lifting arm to its highest position, the tone arm will be lifted to permit the rod to be slid outwardly to place the tone arm back to a desired starting place on the record.

References Cited in the file of this patent

UNITED STATES PATENTS 2,494,063 Simon ------------------ Jan. 10, 1950

FOREIGN PATENTS 1,099,554 France ------------------ Sept. 7, 1955